(12) United States Patent
Marks et al.

(10) Patent No.: US 7,719,287 B2
(45) Date of Patent: May 18, 2010

(54) SYSTEMS AND METHOD FOR MONITORING INFORMATION HANDLING SYSTEM INTERFACES THROUGH CABLES HAVING PLURAL LINKS

(75) Inventors: Kevin T. Marks, Round Rock, TX (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 659 days.

(21) Appl. No.: 11/696,751

(22) Filed: Apr. 5, 2007

(65) Prior Publication Data

US 2008/0247420 A1  Oct. 9, 2008

(51) Int. Cl.
G01R 31/02 (2006.01)
G06F 11/00 (2006.01)
(52) U.S. Cl. .................. 324/542; 324/539; 370/248
(58) Field of Classification Search .......... 324/542, 324/539
See application file for complete search history.

(56) References Cited

U.S. PATENT DOCUMENTS

| 4,385,272 A | 5/1983 | Whitehead | 324/51 |
|---|---|---|---|
| 6,600,755 B1 * | 7/2003 | Overs et al. | 370/465 |
| 6,772,380 B1 * | 8/2004 | Ali et al. | 714/724 |
| 7,613,127 B2 * | 11/2009 | Jonnala et al. | 370/252 |
| 2006/0061369 A1 * | 3/2006 | Marks et al. | 324/542 |
| 2006/0230125 A1 * | 10/2006 | Johnson | 709/220 |
| 2007/0011373 A1 * | 1/2007 | Marks et al. | 710/104 |
| 2007/0070885 A1 * | 3/2007 | Uddenberg et al. | 370/225 |

* cited by examiner

*Primary Examiner*—Timothy J Dole
*Assistant Examiner*—John Zhu
(74) *Attorney, Agent, or Firm*—Hamilton & Terrile, LLP; Robert W. Holland

(57) ABSTRACT

A port width module operating in association with SAS controllers determines the operational state of communication across an SAS cable by comparing the number of links at opposing controllers that are capable of supporting communication with the number of links in DWord synchronization. For example, an information handling system capable of communication of four links at an SAS connector communicates in a normal state across two links where the opposing device is a switch that supports only two links at an SAS connector. An LED at the information handling system indicates normal operations with two links in DWord synchronization by receiving the port width of the opposing device, retrieving its own port width, and comparing the port widths with the number of links in DWord synchronization.

20 Claims, 4 Drawing Sheets

SYSTEMS AND METHOD FOR MONITORING INFORMATION HANDLING SYSTEM INTERFACES THROUGH CABLES HAVING PLURAL LINKS

BACKGROUND OF THE INVENTION

1. Field of the Invention

The present invention relates in general to the field of information handling system cable interfaces, and more particularly to a system and method for monitoring information handling system interfaces through cables having plural links.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with each other and with peripheral devices through external cables. In some instances, information handling system external cables have plural links with each link supporting a communication interface. As an example, in external Serial Attached SCSI (SAS) environments, a cable having four links defined by the SAS standard interfaces devices connected by the cable with a width of one, two, three or all four links. For instance, SAS devices, such as storage devices, interfaced with an SAS external cable typically communicate through all four links. Other SAS devices, such as switches and concentrators used in storage networks accept SAS cables but only interact through two of the four links on the cable. Some SAS devices, such as tape drives, accept SAS cables but only interact through one of the four links. The number of links used by a particular device depends upon the SAS controller card used in the device. For some devices, using all links available through a cable connection adds cost without substantial improvement in the speed at which information is communicated.

Devices interfaced though a cable generally include internal logic to monitor the quality of the cable connection and sometimes include external indicators of the cable connection quality, such as LED lights. For example, SAS controllers establish communication over a link by achieving DWord synchronization and then exchanging an IDENTIFY address frame. With a standard SAS controller, detection of a DWord synchronization at each link of a cable port is sometimes used to illuminate an LED to indicate normal operations. If one or more links of a cable port does not have DWord synchronization, the LED is illuminated amber instead of green to indicate a potential problem or degraded operations. If none of the links of a cable port has DWord synchronization, the LED is not illuminated to indicate a failure of normal operations. In addition to visual indications of an SAS controller's operational status, a device associated with the controller often monitors DWord synchronization status to determine difficulties in operations.

Difficulty tracking proper operation of devices sometimes arises when devices are interfaced by a cable having plural links, such as an SAS cable, in which not all links are used. For example, an SAS cable having four links that interfaces on one end with an information handling system and another end with a tape drive might only use one link to communicate information. Although the tape drive will view a single link with DWord synchronization as indicating normal operations, the information handling system SAS controller will view a single link with DWord synchronization as indicating a potential problem with communication through the cable. If the information handling system SAS controller illuminates an amber LED, an end user has an incorrect indication of degraded operations. One way to address this problem is to have specialized controllers for devices that use less than all links of a cable. However, manufacturing and tracking specialized controllers adds expense and complexity to system operations.

SUMMARY OF THE INVENTION

Therefore a need has arisen for a system and method which aids monitoring of information handling system interfaces through cables having plural links.

In accordance with the present invention, a system and method are provided which substantially reduce the disadvantages and problems associated with previous methods and systems for monitoring information handling system interfaces through cables having plural links. Communication of information between systems across a cable having plural links is monitored at a system by comparing the number of links at the system and at the opposing system that are capable of communicating information with the number of operational links.

More specifically, an information handling system interfaces with other information handling systems and peripheral devices through a cable having plural links, such as an SAS cable having four links. An SAS controller manages communication of information through an external connector port and presents a visual indication of the status of communication, such as with an LED. An EEPROM on each SAS controller stores the width number of links at the controller that are capable of communicating information. A port width module associated with each controller compares the width of the controller's port with the width of an opposing controller's port to determine the number of links of the cable interfacing the controllers that are capable of communicating information. The port width module indicates normal operations if the number of links capable of communicating information equals the number of operation links, such as the number of links with DWord synchronizations associated with the controller. The port width module indicates degraded operations if the number of links capable of communicating information is greater than the number of operational links. The port width module indicates failed operation if no links with DWord synchronizations are associated with the controller.

The present invention provides a number of important technical advantages. One example of an important technical advantage is that devices connected through a cable having plural links can automatically determine inactive links of the cable to more accurately monitor the cable interface. By comparing the expected number of active links at a cable port with the detected number of active links, incorrect indication of degraded operations is avoided where not all links are supported at an opposing device. For example, an SAS controller having the capability to support four links will indicate a green LED if the number of links with DWord synchronizations is two where the opposing device only supports two links. Comparing the number of active links with the expected number of active links allows standardized components to interact with correct visual indications of operation so that specialized components are not needed when less than all links are used.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Monitoring information handling system interfaces through cables having plural links, such as SAS cables, is performed with reference to the number of links supported by the interfaced systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
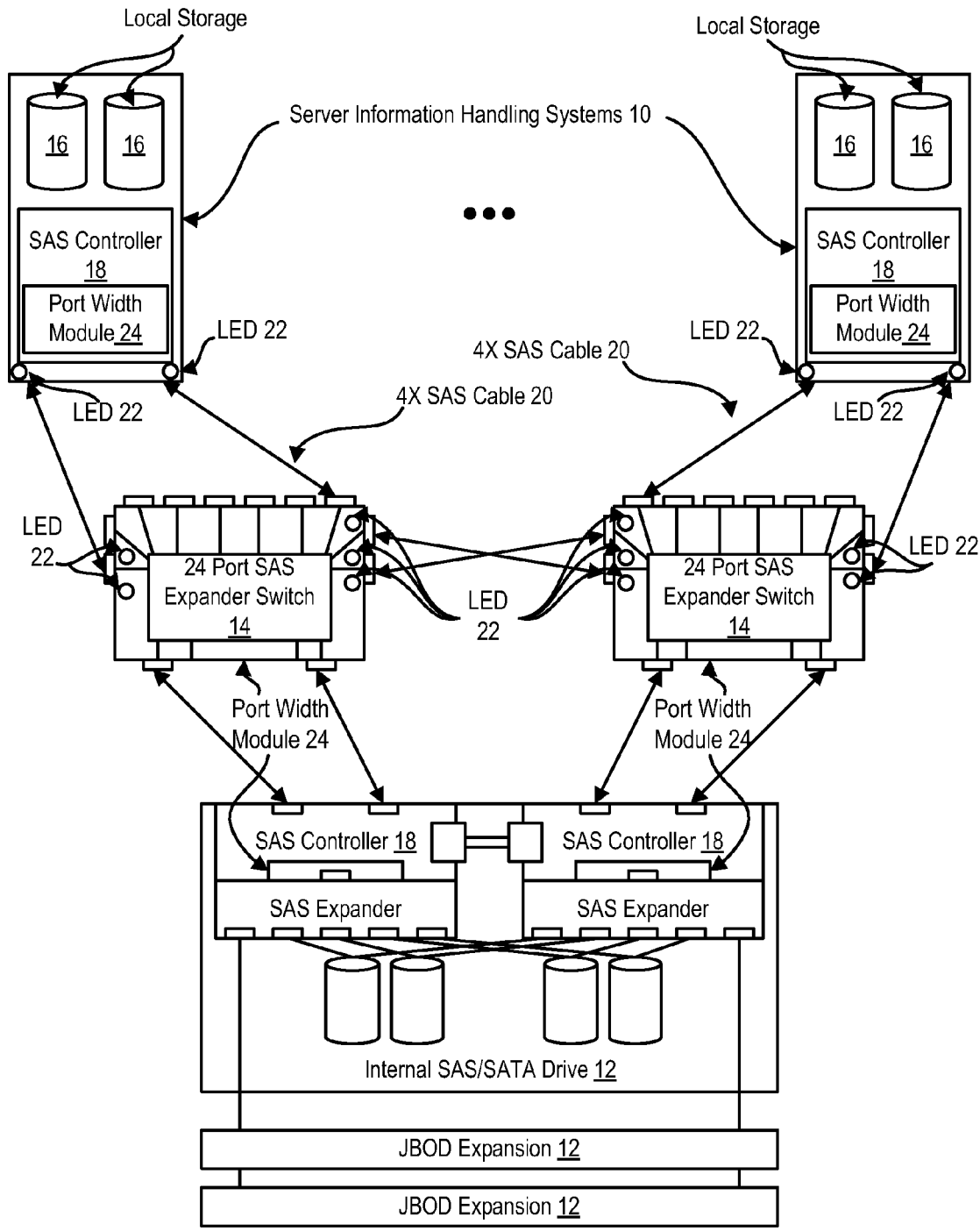
FIG. 1 depicts a block diagram of information handling systems and storage devices interfaced through SAS switches.

Referring now to FIG. 1, a block diagram depicts information handling systems 10 and storage devices 12 interfaced through SAS switches 14. Information handling systems 10 have local storage 16 to store information locally and also interact with storage devices 12 to store information remotely. Interaction between information handling systems 10 and storage devices 12 is managed by SAS controllers 18 disposed on information handling systems 10, storage devices 12 and switch 14. Although SAS controllers 18 each connect with SAS cables 20 that have four links, each SAS controller 18 may support communication over less than four links. For example, SAS controllers 18 disposed in information handling systems 10 support four links while SAS controllers 18 disposed in expander switch 14 support only two links. An LED 22 associated with each SAS controller 18 illuminates predetermined indications of the operational state of communication interfaces supported across cables 20. Illumination of LEDs 22 is managed by a port width module 24 that compares the number of active links with the number of available links to determine the operational state of communication interfaces supported across cables 20. For example, if an SAS controller 18 supports four links and is interfaced with another SAS controller 18 that supports four links, LED 22 will illuminate green if all four links are operational, will illuminate amber if at least one but less than four links are operational, and will not illuminate if no links are operational. In contrast, if one of the SAS controllers 18 supports less than four links, each LED 22 connected by a cable 20 between such SAS controllers 18 will illuminate green if the maximum number of available links are operational, such as three, two or one link. In addition to managing illumination of LED 22, port width module 24 may provide the operational state to system management modules, such as a BMC or IMC of a server information handling system 10.

Figure 2:
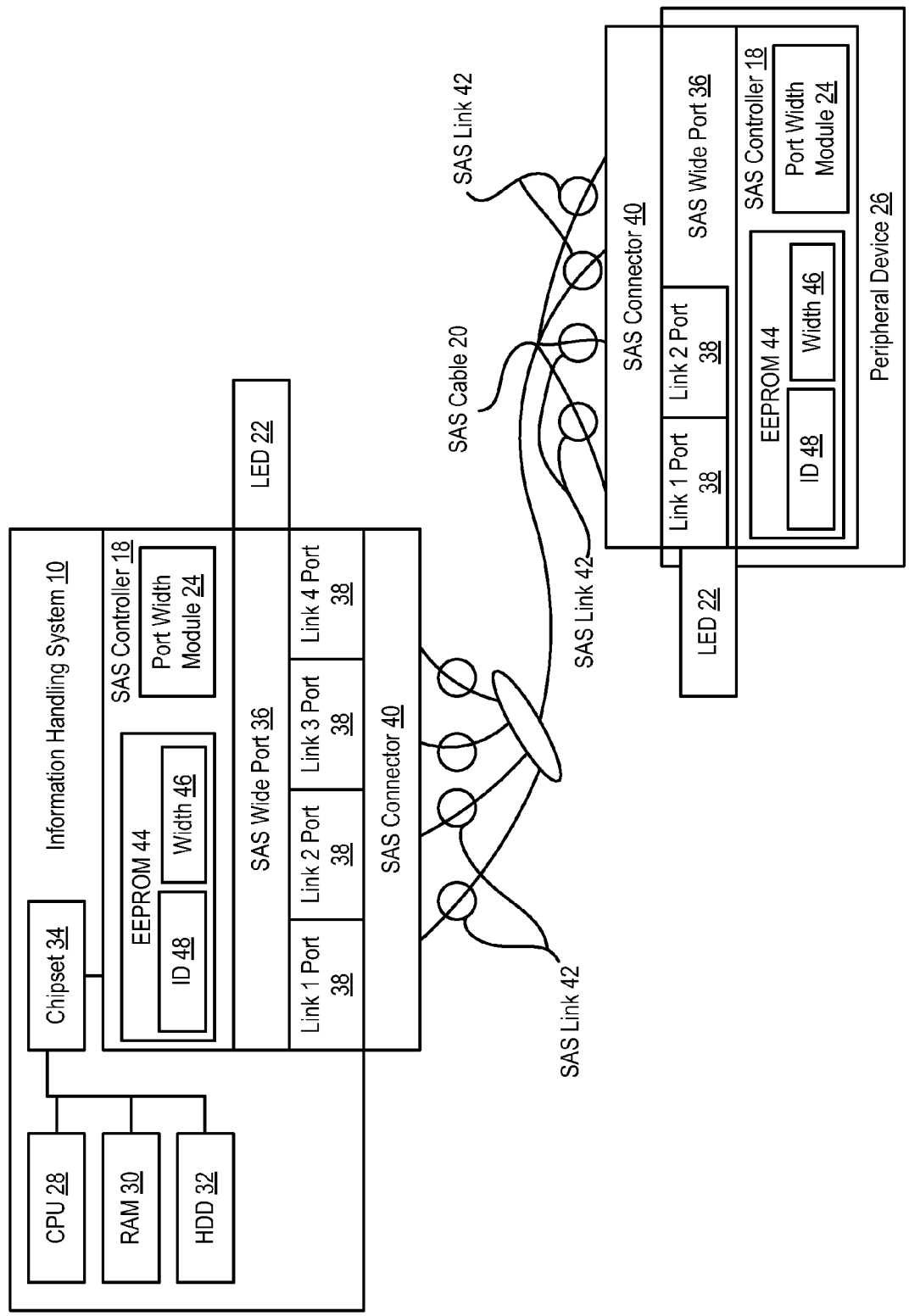
FIG. 2 depicts a block diagram of an information handling system interfaced with a device through SAS controllers having different port widths.

Referring now to FIG. 2, a block diagram depicts an information handling system 10 interfaced with a peripheral device 26 through SAS controllers 18 having different port widths. Information handling system 10 has a variety of processing components that cooperate to process information, such as a CPU 28, RAM 30, a hard disk drive 32 and a chipset 34. The processing components communicate information with peripheral device 26 through SAS controllers 18 and SAS cable 20. Each SAS controller 18 has an SAS wide port 36 with between one and four link ports 38. An SAS connector 40 couples to cable 20 so that each SAS link 42 of cable 20 interfaces with a port link 38. In the example embodiment depicted by FIG. 2, information handling system 10 has a wide port 36 that supports four SAS links 42 while peripheral device 26 has a wide port 36 that supports two SAS links 42. Port width module 24 manages illumination of its associated LED 22 by comparing its port width with the port width of the opposing controller and determining if the number of links 42 in DWord synchronization are equal to or less than the smaller of the port widths. Each SAS controller 18 has EEPROM 44 that stores the port width 46 of the controller and an identifier 48 for the controller, such as a CONFIGURED WIDE PORT ID field at Byte 2, bits 4-7 of the IDENTIFY Address frame. Port width module 24 obtains the port width 46 for its opposing controller 18 by reference to identifier 48 and compares the opposing controller's port width 46 with port width 46 stored in EEPROM 44. In this manner, for instance, an SAS controller 18 that supports four link ports 38 will present an indication of normal operations, such as a green LED, with only two links with DWord synchronizations where an opposing device 26 supports only two link ports 38 in its wide port 36.

Figure 3:
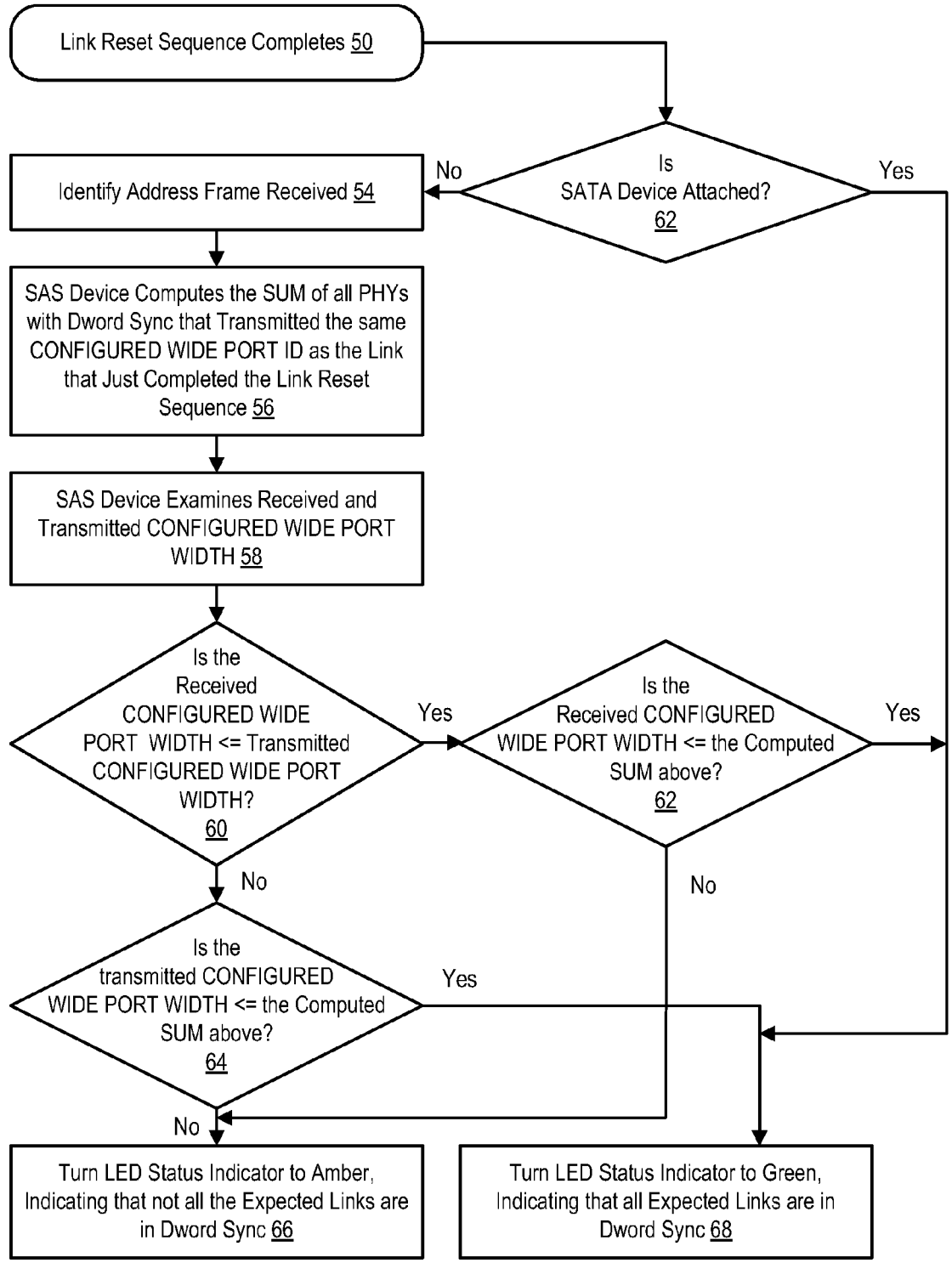
FIG. 3 depicts a flow diagram of a process for monitoring SAS link interfaces by detecting DWord synchronization on available links.

Referring now to FIG. 3, a flow diagram depicts a process for monitoring SAS link interfaces by detecting DWord synchronization at available links. The process begins at step 50 upon completion of a link reset sequence at an SAS controller. At step 52 a determination is made of whether a SATA device is attached to the controller. If a SATA device is attached, then only one link is supported so that normal operations are indicated at step 68 with a green light if a single link with DWord synchronization exists. If the attached device is not a SATA device, the process continues to step 54 at which the IDENTIFY Address frame defined by SAS is received from the attached device. The IDENTIFY Address frame includes the CONFIGURED WIDE PORT ID field and an additional field of CONFIGURED WIDE PORT WIDTH that reflects the number of links supported by the SAS controller of the attached device. For example, the CONFIGURED WIDE PORT WIDTH is inserted in the IDENTIFY address frame at Byte 3 in Bits 4-7.

At step 56, the port width module of the SAS controller computes the total number of PHYS, or physical links, that have DWord synchronization and the same CONFIGURED WIDE PORT ID as the link that just completed the Link Reset Sequence. At step 58, the port width module of the SAS controller analyzes the received and transmitted CONFIGURED WIDE PORT WIDTH of attached device and of itself respectively from the IDENTIFY address frame. At step 60 if the received width is less than or equal to the transmitted width the process continues to step 62. At step 62, if the received width is less than or equal to the computed SUM of links in DWord synchronization, then the process completes at step 68 to indicated normal operations. If at step 62 the received width is greater than the computed SUM of links in DWord synchronization, the process continues at step 66 to indicate a degraded state of operations. If at step 60 the received width is greater than the transmitted port width, the process continues to step 64 to determine if the transmitted width is less than or equal to the SUM of links in DWord synchronization. If at step 64 the transmitted width is less than or equal to the SUM of links in DWord synchronization, the process continues to step 68 to indicated normal operations. If at step 64 the transmitted width is greater than the SUM of links in DWord synchronization, the process continues to step 66 to indicated degraded operations. In summary, the comparison between the number of links in DWord synchronization and the smaller number of links supported by the transmitting and receiving SAS controllers results in an indication of normal operations if all available links are in DWord synchronization and an indication of degraded operations if all available links are not in DWord synchronization.

Figure 4:
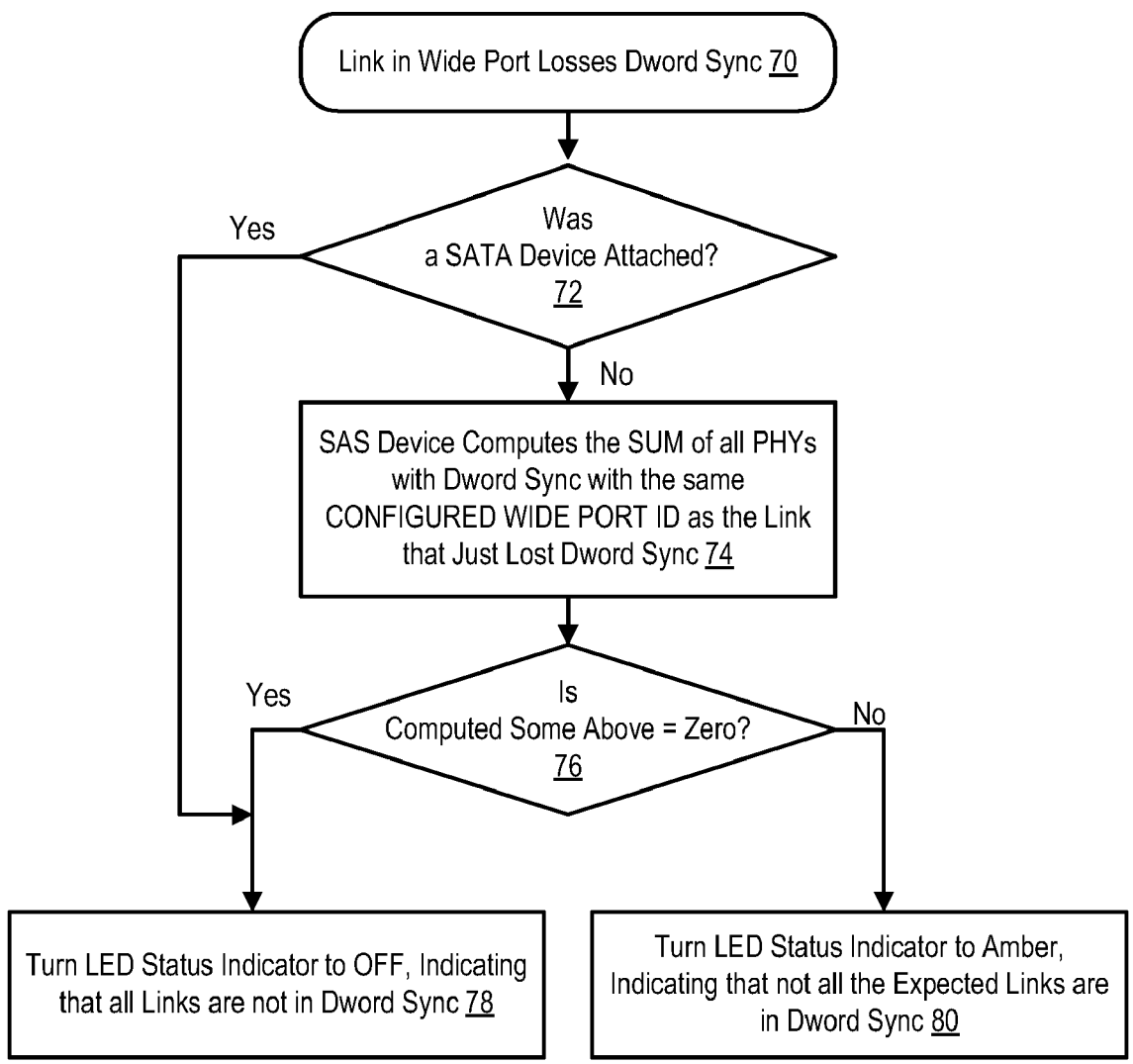
FIG. 4 depicts a flow diagram of a process for monitoring SAS link interfaces in the event of loss of DWord synchronization.

Referring now to FIG. 4, a flow diagram depicts a process for monitoring SAS link interfaces in the event of loss of DWord synchronization. The process begins at step 70 with loss of DWord synchronization on a link of a wide port. At step 72, a determination is made of whether the device that lost DWord synchronization was a SATA device, which indicates only one link is available. If so, the process continues to step 78 to indicate an off status at the LED. If at step 72 the device is not a SATA device, the process continues to step 74 to compute the SUM of all PHY links with DWord synchronization that have the same CONFIGURED WIDE PORT ID as the link that just lost DWord synchronization. If the number of links that have DWord synchronization is greater than zero, the process continues to step 80 to indicate degraded operations with an amber LED. If the number of links that have DWord synchronization is zero, the process continues to step 78 to turn the LED to off to indicate a lack of operations at the connector.

Although the present invention has been described in detail, it should be understood that various changes, substitutions and alterations can be made hereto without departing from the spirit and scope of the invention as defined by the appended claims.

What is claimed is:

1. An information handling system comprising:
   processing components operable to process information;
   an external port operable to couple with an external cable, the port and cable supporting communication through plural links;
   a controller interfacing the processing components and the external port, the controller operable to manage communication of information between the processing components and a device coupled to the port with the cable;
   a port width stored at the controller, the port width identifying the number of links supported by the external port;
   a port width module in communications with the controller, the port width module receiving a port width from the device and comparing the received port width with the port width stored at the controller to determine the number of links of the cable that are capable of communicating information between the processing components and the device; and
   wherein the port width module further computes the number of links communicating information between the processing components and the device.

2. The information handling system of claim 1 further comprising a visual indicator associated with the controller and operable to present a visual indication of an operational state of communication of information across the cable.

3. The information handling system of claim 2 wherein the visual indicator is further operable to present a normal state if the number of links communicating information between the processing components and the device equals the number of links of the cable that are determined as capable of communicating information between the processing components and the device.

4. The information handling system of claim 2 wherein the visual indicator is further operable to present a degraded state if the number of links communicating information between the processing components and the device is at least one but less than the number of links of the cable that are determined as capable of communicating information between the processing components and the device.

5. The information handling system of claim 1 wherein the external port comprises an SAS port, the controller comprises an SAS controller and the cable comprises an SAS cable.

6. The information handling system of claim 4 wherein the port width comprises a field in the SAS IDENTIFY Address frame.

7. The information handling system of claim 5 wherein the device comprises a switch having a port width of two links.

8. The information handling system of claim 5 wherein the device comprises a tape drive having a port width of one link.

9. A method for monitoring interfaces between first and second devices established through a cable having plural links, the method comprising:
   communicating a port width from the second device to the first device, the port width defining the number of links of the cable supported by the second device;
   retrieving a port width from storage at the first device, the port width defining the number of links of the cable supported by the first device;
   determining the number of links of the cable that support communication of information between the first and second devices;
   comparing at the first device the port width of the first device, the port width of the second device and the number of links that support communication of information to determine a state of communication across the cable.

10. The method of claim 9 wherein comparing further comprises determining a normal operations state if the number of links that support communication of information is equal to the smaller of the first device port width and the second device port width.

11. The method of claim 9 wherein comparing further comprises determining a degraded operations state if the number of links that support communication of information is less than the smaller of the first device port width and the second device port width.

12. The method of claim 9 further comprising:
communicating a port width from the first device to the second device, the port width defining the number of links of the cable supported by the first device;
retrieving a port width from storage at the second device, the port width defining the number of links of the cable supported by the second device; and
comparing at the second device the port width of the first device, the port width of the second device and the number of links that support communication of information to determine a state of communication across the cable.

13. The method of claim 9 wherein the first and second devices comprise SAS controllers.

14. The method of claim 13 wherein the port width comprises a field in the SAS IDENTIFY address frame.

15. The method of claim 9 wherein the first device comprises an information handling system having a port width of four links and the second device comprises a storage device having a port width of one link.

16. The method of claim 9 wherein the first device comprises an information handling system having a port width of four links and the second device comprises a switch having a port width of two links.

17. A system for monitoring communication of information between first and second devices across a cable having plural links, the system comprising:
a port width stored at the first device; and
a port width module in communications with the first device, the port width module receiving a port width from the second device and comparing the received port width with the port width stored at the first device to determine the number of links of the cable that are capable of communicating information, the port width module further determining a state of communication of information across the cable by comparing the number of links of the cable that are capable of communicating information with a number of links of the cable that are communicating information.

18. The system of claim 17 wherein the first and second devices comprise SAS controllers.

19. The system of claim 18 wherein the number of links of the cable that are communicating information comprises the number of links in DWord synchronization.

20. The system of claim 19 wherein the first device comprises a port width of four links, the second device comprises a port width of two links and the state of communication is normal if two links have DWord synchronization.

* * * * *